United States Patent Office 3,288,855
Patented Nov. 29, 1966

3,288,855
FLUORINATED DIONES
Robert M. Schisla, Kirkwood, and William C. Hammann, St. Louis, Mo., assignors to Monsanto Research Corporation, St. Louis, Mo., a corporation of Delaware
No Drawing. Filed Mar. 25, 1963, Ser. No. 267,770
3 Claims. (Cl. 260—590)

This invention relates to aromatically substituted perfluoroalkanediones and more particularly provides new and valuable bis(aryloxyaryl)perfluoroalkanediones, the method of preparing the same, and heat-exchange compositions comprising said diones.

According to the invention, bis(aryloxyaryl)perfluoroalkanediones are prepared by reacting the acyl halide of a perfluorinated alkanedicarboxylic acid with an aryl ether, substantially according to the scheme:

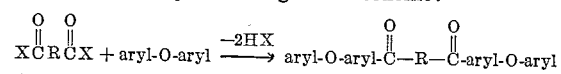

wherein X is halogen, R is a perfluorinated alkylene radical of from 1 to 6 carbon atoms and aryl denotes a benzenoid hydrocarbon radical having from 6 to 10 carbon atoms and being free of olefinic and acetylenic unsaturation.

Examples of acyl halides which are useful for preparing the presently provided perfluorodiones are the acyl chlorides, bromides, iodides or fluorides of the 3 to 8 carbon perfluoroalkanedicarboxylic acids, e.g., difluoromalonyl chloride or iodide, tetrafluorosuccinyl bromide or chloride, hexafluoroglutaryl bromide or fluoride, octafluoroadipoyl bromide or iodide, decafluoropimeloyl chloride or bromide, dodecafluorosuberoyl chloride or iodide, etc. Benzenoid ethers with which such halides condense to give the diones are, e.g., the simple ethers such as phenyl ether, o-, m- or p-tolyl ether, benzyl ether; bis(2-ethylphenyl)ether, bis(o-, m-, or p-butylphenyl)ether, or α- or β-naphthyl ether, or mixed ethers such as phenyl m-tolyl ether, α- or β-phenoxynaphthalene, etc.

As illustrative of the compounds prepared by the present process are 1,3-bis(p-phenoxyphenyl)-2,2-difluoro-1,3-propanedione which is obtained from difluoromalonyl bromide and phenyl ether; 1,4-bis[p-(m-tolyloxy)-m-tolyl]tetrafluoro-1,4-butanedione which is prepared from tetrafluorosuccinyl chloride and m-tolyl ether; 1,5-bis[α-(β-naphthyloxy)-β-naphthyl]hexafluoro-1,5-pentanedione which is obtained from hexafluoroglutaryl iodide and β-naphthyl ether; 1,6-bis(p-phenoxyphenyl)octafluoro-1,6-pentanedione which is prepared from octafluoroadipoyl chloride and phenyl ether; 1,7-bis[p-(o-propylphenoxy)-o-propylphenyl]decafluoro-1,7-heptanedione which is prepared from decafluoro-1,7-heptanedioyl bromide and bis(o-propylphenyl) ether; 1,8-bis(benzyloxybenzyl)dodecafluoro-1,8-octanedione which is prepared from 1,8-octanedioyl iodide and benzyl ether, 1,5-bis[p-(3-ethylphenoxy)phenyl]hexafluoro-1,5-pentanedione which is obtained from hexafluoroglutaryl fluoride and phenyl 3-ethylphenyl ether; 1-(p-phenoxyphenyl)-4-[p-(3-butylphenoxy)-phenyl]tetrafluoro-1,4-butanedione which is obtained from tetrafluorosuccinyl bromide and a substantially equimolar quantity each of phenyl ether and m-butylphenyl phenyl ether, etc.

Reaction of the perfluoro-substituted alkanedicarboxylyl halide with the benzenoid ether is conducted in the presence of a Friedel-Crafts catalyst and an inert, organic liquid solvent or diluent. Examples of Friedel-Crafts catalyst for use in the present process are anhydrous metal or boron halides such as the aluminum, ferric, stannic, zinc, titanium, gallium and boron chlorides, bromides, iodides and fluorides. Although any of these catalysts are useful in catalyzing the reaction, the use of aluminum and stannic halides, and particularly of the chlorides and bromides, is preferred. As solvents there may be used, e.g., carbon disulfide, ethyl ether, chloroform, carbon tetrachloride, ethylene dichloride, hexane, nitrobenzene, o-dichlorobenzene, etc.

Formation of the bis(aryloxyaryl)perfluoroalkanediones takes place by simply contacting the perfluoroalkanedicarboxylic halide with the benzenoid ether in presence of said catalyst and of said solvent at ambient temperature or with heating. In some instances, reaction rate is accelerated by heating and, particularly when working with the higher molecular weight reactants, temperatures of from, say, 40° C. to refluxing are advantageously used. With the lower diacyl halides, the reaction may be slightly exothermic, but external heating may be used for the purpose of decreasing reaction time. Generally, temperatures of from, say, 40° C. to 140° C. are useful.

Since the diketones are formed by condensation of one mole of the dicarboxylic halide with two moles of the benzenoid ether, these reactants are advantageously employed in such stoichiometric proportions. However, an excess of the ether may be used, since any unreacted material is readily recovered from the final reaction product. When working with a difficultly available diacyl halide, it is usually desirable to use an excess of the generally more easily obtainable ether in order to thereby assure complete participation of said halide in the reaction. The concentration of Friedel-Crafts catalyst to be employed in the process of this invention is similarly not critical. While generally there is recommended the use of about two moles of the catalyst per mole of the diacyl halide, lower or greater quantities of the catalyst may be employed. Here again, as in the case of the diacyl halide to ether proportion, if the halide is a difficultly available one, it is frequently wise to use an excess of the catalyst in order to be sure that the very best yields are obtained from the costly diacyl halide; thus, there may be used, say, from 3 to 4 molar proportions of catalyst per mole of the diacyl halide. Use of catalyst in a ratio which is less than the 2:1 diacyl halide:catalyst ratio will generally depress yields of product; but so long as some catalyst is present the desired bis(aryloxyaryl)perfluoroalkanedione is formed in yields which will bear a relationship to the catalyst quantity.

All of the reaction conditions, i.e., temperature, reactant and catalyst proportions, nature of the diluent, etc., can be readily arrived at by easy experimentation. Progress of the reaction can be followed by noting evolution of the by-product hydrogen halide and change in viscosity and/or by sampling the reaction mixture at intervals and determining the content of the desired product, e.g., by nuclear magnetic resonance analysis.

The presently provided bis(aryloxyaryl)perfluoroalkanediones are stable, well-characterized compounds which range from waxy or crystalline solids to highly fluid liquids. They are generally useful as heat-resistant plasticizers for vinyl resins and plastics, e.g., for polyvinyl chloride, polyvinylidene chloride, vinyl chloride-vinyl acetate copolymer, etc. The present compounds, especially those which are liquids at ambient temperature, are eminently suited for use as heat-exchange media. The decomposition temperature of the compounds often exceeds 500° F., they possess favorable vapor pressure characteristics, and even when exposed to conditions of extreme heat, say to temperatures above 1,000° F. the compounds do not ignite spontaneously.

The invention is further illustrated by, but not limited to, the following example:

*Example 1*

Hexafluoroglutaryl chloride (55.4 g., 0.2 mole) was added dropwise with stirring, at room temperature, over a 2-hour period to 68 g. (0.4 mole) of phenyl ether containing 79.8 g. (0.6 mole) of aluminum chloride and o-dichlorobenzene as solvent. The resulting mixture was then heated for 30 minutes at 50° C. and subsequently poured into crushed ice containing an excess of hydrochloric acid. The organic material was taken up in benzene and dried over magnesium sulfate. After removal of benzene by distillation in vacuo, a viscous oil was collected. This was distilled to give a fraction, B.P. 251–252° C./1 mm., which upon redistillation gave the substantially pure, liquid 1,5-bis(p-phenoxyphenyl)-2,2,3,3,4,4-hexafluoro-1,5-pentanedione, B.P. 243–245° C./0.05 mm., which analyzed as follows:

Found: C, 63.83%; H, 3.23%; F, 21.00%. Calc'd for $C_{29}H_{18}F_6O_4$: C, 63.97%; H, 3.33%; F, 20.93%.

The decomposition of the 1,5-bis(p-phenoxyphenyl)-2,2,3,3,4,4-hexafluoro-1,5-pentanedione, as determined with the isoteniscope, was found to be 576° F.

Temperatures for vapor pressure equal to certain pressures of mercury were determined to be as follows:

| Temp., ° F.: | Mm. Hg |
|---|---|
| 320 | 10 |
| 373 | 100 |
| 423 | 600 |
| 431 | 760 |

The autogenous ignition temperature, measured by ASTM procedure, and adhering to the detailed directions given by M. G. Zabetakis et al. in "Industrial and Engineering Chemistry," 46, 2173 (1954), was found to be 1050° F. When dropped on the surface of a molten aluminum casting alloy heated to 1300° F., the 1,5-bis(p-phenoxyphenyl) - 2,2,3,3,4,4-hexafluoro-1,5-pentanedione burned without spark.

What is claimed is:

1. A compound of the formula

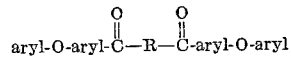

wherein R is a perfluorinated alkylene radical of from 1 to 6 carbon atoms and aryl denotes a benzenoid hydrocarbon radical having from 6 to 10 carbon atoms and being free of olefinic and acetylenic unsaturation.

2. A compound of the formula

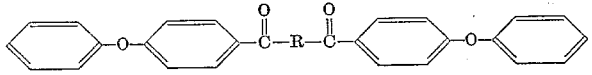

wherein R is a perfluorinated alkylene radical of from 1 6 carbon atoms.

3. 1,5-bis(p-phenoxyphenyl) - 2,2,3,3,4,4-hexafluoro-1,5-pentanedione.

References Cited by the Examiner

UNITED STATES PATENTS

| 2,807,605 | 9/1957 | Havens | 260—590 |
| 2,945,002 | 7/1960 | Van Allen et al. | 260—590 |

LEON ZITVER, *Primary Examiner.*

DANIEL D. HORWITZ, *Examiner.*